(12) United States Patent
Yamamoto et al.

(10) Patent No.: US 10,450,468 B2
(45) Date of Patent: Oct. 22, 2019

(54) SURFACE TREATMENT COMPOSITION FOR COATED STEEL SHEET, SURFACE TREATED PLATED STEEL SHEET AND METHOD OF PRODUCTION OF SAME, AND COATED PLATED STEEL SHEET AND METHOD OF PRODUCTION OF SAME

(71) Applicants: Nihon Parkerizing Co., Ltd., Tokyo (JP); Nippon Steel & Sumikin Coated Sheet Corporation, Tokyo (JP)

(72) Inventors: Shigeki Yamamoto, Tokyo (JP); Tomohiro Iko, Tokyo (JP); Eisuke Kudo, Tokyo (JP); Hiromasa Nomura, Tokyo (JP); Hiroyuki Oyokawa, Tokyo (JP)

(73) Assignees: NIHON PARKERIZING CO., LTD., Tokyo (JP); NIPPON STEEL & SUMIKIN COATED SHEET CORPORATION, Tokyo (JP)

( * ) Notice: Subject to any disclaimer, the term of this patent is extended or adjusted under 35 U.S.C. 154(b) by 983 days.

(21) Appl. No.: 14/786,139

(22) PCT Filed: Apr. 18, 2014

(86) PCT No.: PCT/JP2014/061094
§ 371 (c)(1),
(2) Date: Oct. 21, 2015

(87) PCT Pub. No.: WO2014/175194
PCT Pub. Date: Oct. 30, 2014

(65) Prior Publication Data
US 2016/0083590 A1    Mar. 24, 2016

(30) Foreign Application Priority Data

Apr. 22, 2013    (JP) ................................ 2013-089484

(51) Int. Cl.

| | | |
|---|---|---|
| *C09D 5/08* | (2006.01) | |
| *C09D 175/04* | (2006.01) | |
| *B05D 7/00* | (2006.01) | |
| *B05D 1/40* | (2006.01) | |
| *B05D 3/04* | (2006.01) | |
| *B32B 15/08* | (2006.01) | |
| *B32B 15/18* | (2006.01) | |
| *B32B 15/095* | (2006.01) | |
| *C23C 22/44* | (2006.01) | |
| *C09D 7/61* | (2018.01) | |
| *C08K 3/16* | (2006.01) | |

(52) U.S. Cl.
CPC .............. *C09D 5/084* (2013.01); *B05D 1/40* (2013.01); *B05D 3/0413* (2013.01); *B05D 7/586* (2013.01); *B32B 15/08* (2013.01); *B32B 15/095* (2013.01); *B32B 15/18* (2013.01); *C09D 7/61* (2018.01); *C09D 175/04* (2013.01); *C23C 22/44* (2013.01); *C08K 3/16* (2013.01); *C23C 2222/20* (2013.01); *Y10T 428/12556* (2015.01); *Y10T 428/12569* (2015.01); *Y10T 428/12757* (2015.01); *Y10T 428/12972* (2015.01); *Y10T 428/12979* (2015.01); *Y10T 428/263* (2015.01); *Y10T 428/264* (2015.01); *Y10T 428/265* (2015.01)

(58) Field of Classification Search
CPC ....... C23C 22/44; C23C 2222/20; B05D 1/40; B05D 3/0413; B05D 7/586; C09D 5/084; C09D 175/04; C09D 5/086; C09D 5/08; C09D 175/12; B32B 15/08; B32B 15/095; B32B 15/18; Y10T 428/265; Y10T 428/264; Y10T 428/263; Y10T 428/12569; Y10T 428/12556; Y10T 428/12779; Y10T 428/12757; Y10T 428/12972; Y10T 428/12979
See application file for complete search history.

(56) References Cited

U.S. PATENT DOCUMENTS

| | | | |
|---|---|---|---|
| 2001/0037748 A1 | 11/2001 | Shimakura et al. | |
| 2012/0190790 A1* | 7/2012 | Yamaguchi | B32B 7/12 524/591 |
| 2014/0197039 A1 | 7/2014 | Inbe et al. | |

FOREIGN PATENT DOCUMENTS

| | | |
|---|---|---|
| EP | 2418301 A1 | 2/2012 |
| JP | 2001-240979 A | 9/2001 |
| JP | 2003105562 A | 4/2003 |
| JP | 2005-169765 A | 6/2005 |

(Continued)

OTHER PUBLICATIONS

Office Action dated Aug. 8, 2016, in corresponding Korean Patent Application No. 10-2015-7030109 (English-language translation provided).

(Continued)

*Primary Examiner* — Michael E. La Villa
(74) *Attorney, Agent, or Firm* — Hunton Andrews Kurth LLP

(57) ABSTRACT

An aqueous surface treatment composition for coated steel sheet securing sufficient working adhesion while causing the formation of a surface treatment layer imparting excellent overhang corrosion resistance even without containing chrome, that is, a surface treatment composition containing a specific organic silicon compound, hexafluorometallic acid, a urethane resin having specific cationic groups, a vanadium compound, and an aqueous medium and sufficiently securing working adhesion while imparting excellent overhang corrosion resistance by the urethane resin having cationic groups and a total amine value of specific values is provided.

10 Claims, 1 Drawing Sheet

(56) References Cited

FOREIGN PATENT DOCUMENTS

| | | |
|---|---|---|
| JP | 2006152435 A | 6/2006 |
| JP | 2006-328445 A | 12/2006 |
| JP | 2009-127057 A | 6/2009 |
| JP | 2012-237065 A | 12/2012 |
| KR | 2009-0110256 A | 10/2009 |
| KR | 2010-0020429 A | 2/2010 |
| TW | 2009-34891 A1 | 8/2009 |
| TW | 2011-24560 A1 | 7/2011 |
| WO | WO 2013/027837 A1 | 2/2013 |
| WO | WO 2013/035765 A1 | 3/2013 |

OTHER PUBLICATIONS

European Search Report in corresponding EP Application No. 14788206, dated Nov. 23, 2016.
Office Action dated Jun. 29, 2017, in corresponding Taiwan Patent Application No. 103114369 (English-language translation provided).
International Search Report dated Jul. 8, 2014 issued in corresponding PCT Application No. PCT/JP2014/061094.
Office Action dispatched on Feb. 12, 2019, in corresponding Indian Patent Application No. 9887/DELNP/2015.

\* cited by examiner

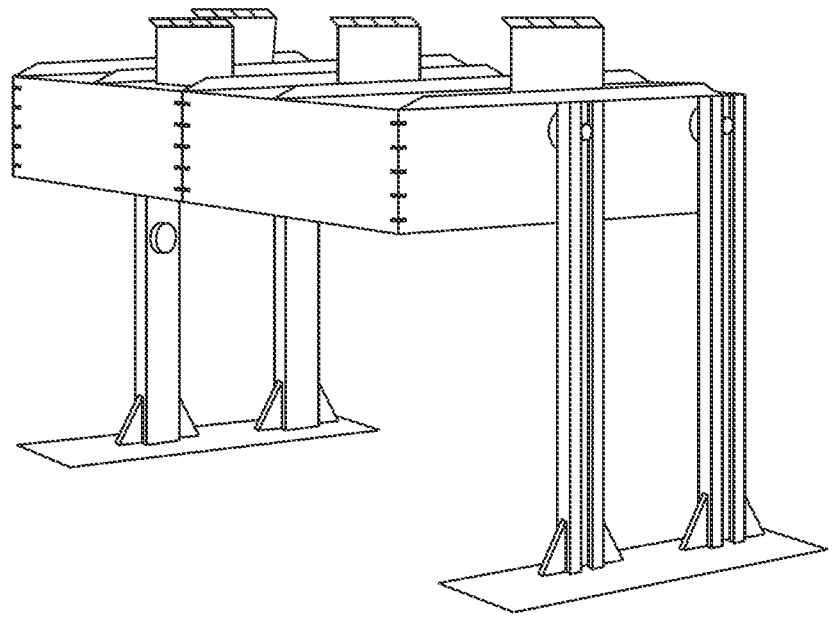

SURFACE TREATMENT COMPOSITION FOR COATED STEEL SHEET, SURFACE TREATED PLATED STEEL SHEET AND METHOD OF PRODUCTION OF SAME, AND COATED PLATED STEEL SHEET AND METHOD OF PRODUCTION OF SAME

CROSS REFERENCE TO RELATED APPLICATION(S)

This application is a national stage application of International Application No. PCT/JP2014/061094, filed Apr. 18, 2014, which is incorporated by reference in its entirety, and which claims priority to Japanese Patent Application No. JP 2013-089484 filed on Apr. 22, 2013.

TECHNICAL FIELD

The present invention relates to an aqueous surface treatment composition for forming a surface treatment layer giving excellent overhang corrosion resistance in coated steel sheet (also called "precoated steel sheet"), surface treated plated steel sheet having that surface treatment layer, a method of production of the same, coated plated steel sheet, and a method of production of the same.

BACKGROUND ART

In the field of outdoor building materials, coated steel sheet having a colored organic film at its outermost layer is being widely used. A typical coated steel sheet is comprised of plated steel sheet treated on its surface for the purpose of imparting adhesion and covered by an organic film of a two-layer structure comprised of a primer coat and a top coating layer. The coated steel sheet has aesthetic properties while having workability enabling it to be able to withstand roll forming or bending etc. and is considered to require excellent corrosion resistance enabling it to withstand long term outdoor exposure.

Coated steel sheet (precoated steel sheet) is steel sheet precoated by the steel sheet manufacturer for use as a material to be worked. It is later cut and shaped by the end user. For this reason, a high coat adhesion able to withstand later post-processing is considered required. Further, the sheet is often used with the cut end face parts bared as they are. In coated steel sheet used in the field of outdoor building materials, the particularly important performance is the corrosion resistance under overhangs. The areas under overhangs are prevented from being cleaned by rain, so particles of sea salt and other corrosive factors borne by the air and deposited there remain there for long periods without being washed away. As a result, the corrosive environment under overhangs is more severe than usual and is known to increase corrosion under the coating called "edge creep" resulting from corrosion from the cut end face parts of the coated steel sheet. That is, overhang corrosion resistance preventing such corrosion has been considered necessary.

To impart corrosion resistance, a coating composition containing hexavalent chrome, called "chromate treatment", excellent in adhesion and corrosion resistance as surface treatment at coated steel sheet and containing a chrome-based rust-proofing pigment as a primer has been used since the past and is still being broadly used even at the present. However, due to the issue of the environmental load of hexavalent chrome, in recent years, chromate-free coated steel sheet has been strongly demanded in the field of outdoor building materials.

As the surface treatment agent for coated steel sheet, for example, PLT 1 discloses a surface treatment agent containing a silane coupling agent and its hydrolyzed condensates, aqueous dispersed silica, a zirconium compound, etc. in specific ratios. Further, PLT 2 discloses a surface treatment agent containing a silane coupling agent, cationic urethane resin, Zr compound and/or Ti compound, and a fluorine-containing inorganic compound in specific ratios. However, these surface treatment agents are applied to coated steel sheet based on hot dip galvanized steel sheet in the field of household electrical appliances. The ratios of mixture of the compounds and the types or structures of the resins used for obtaining a level of corrosion resistance demanded in the field of outdoor building materials have not been prescribed yet, so sufficient overhang corrosion resistance cannot be obtained by just application of these to coated steel sheet in the field of outdoor building materials.

PLT 3 discloses metal surface treatment compositions containing specific structures of a polyurethane resin, phosphoric acid compound, vanadium compound, zirconium compound, titanium compound, cobalt compound, nickel compound, silane coupling agent, silica particles, etc. However, these treatment compositions are used for temporary rust-proofing of metal materials before coating or without coating. When used instead for surface treatment of coated steel sheet where the mechanism of corrosion differs, the action of elution of the rust-proofing agent contained conversely becomes a cause of blistering of the coating layer, so a sufficient corrosion resistance of the coated steel sheet cannot be obtained. Further, the adhesion of this treatment composition is of a level envisioning the case of coating after processing. The level of working adhesion demanded for coated steel sheet also cannot be obtained.

PLT 4 discloses coated Zn—Al-based alloy plated steel sheet excellent in corrosion resistance having a Zn—Al-based alloy plating layer on which an undercoat in which a magnesium salt and phosphoric acid salt are mixed is formed via a chemical conversion film containing a titanium compound, zirconium compound, fluoride, etc. However, the chemical conversion film in mainly a fluoro compound or other inorganic ingredient. In stringent processing, the chemical conversion film cannot follow the processing and a sufficient coating adhesion cannot be obtained. Even if that chemical conversion film contains an organic resin, a sufficient working adhesion cannot be obtained.

CITATIONS LIST

Patent Literature

PLT 1: Japanese Patent Publication No. 2001-240979A
PLT 2: Japanese Patent Publication No. 2006-328445A
PLT 3: Japanese Patent Publication No. 2009-127057A
PLT 4: Japanese Patent Publication No. 2005-169765A

SUMMARY OF INVENTION

Technical Problem

The present invention was made to solve the above problems in the prior art and has as its object the provision of an aqueous surface treatment composition for coated steel sheet securing sufficient working adhesion while causing the formation of a surface treatment layer imparting excellent overhang corrosion resistance even without containing chrome and the provision of coated plated steel sheet using that aqueous surface treatment composition.

Solution to Problem

The inventors engaged in intensive studies to achieve the above object and as a result discovered that in a surface treatment composition comprising a specific organic silicon compound, hexafluorometallic acid, urethane resin having specific cationic groups, vanadium compound, and aqueous medium, by restricting the cationic groups and the total amine value of the urethane resin to specific ranges, a surface treatment layer securing sufficient working adhesion while imparting excellent overhang corrosion resistance is obtained, and thereby completed the present invention.

That is, the present invention is shown below:

(1) A surface treatment composition for coated steel sheet comprising:
an organic silicon compound (A),
a hexafluorometallic acid (B),
a urethane resin having one or more cationic groups (C),
a vanadium compound (D), and
an aqueous medium (E),
wherein,
the organic silicon compound (A) is selected from a hydrolyzed product and a hydrolyzed condensate of an aminosilane compound having one or more primary amino groups as well as mixtures of thereof,
the cationic groups of the urethane resin (C) are cationic groups represented by the following general formula [I]:

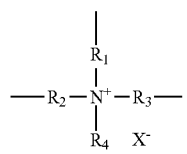

wherein, each of $R_1$, $R_2$ and $R_3$ represent, mutually independently, $C_1$ to $C_6$ alkyl group or $C_2$ to $C_{10}$ alkylene groups, $R_4$ represents a hydrogen atom or $C_1$ to $C_6$ alkyl group, and $X^-$ represents an anionic counter ion, the cationic groups are included in the urethane resin (C) within the range of 0.03 to 0.15 mol/kg, and a total amine value of the urethane resin (C) is 1 to 10 mgKOH/g.

(2) The surface treatment composition for coated steel sheet according to (1), wherein
a ratio [$MF_6/NH_2$] of a number of moles of the hexafluorometallic acid ($MF_6$) (B) to a number of moles of the primary amino groups ($NH_2$) of the organic silicon compound (A) is 0.2 to 0.4,
a solid content mass ratio [(A+B)/C] of the total of the organic silicon compound (A) and the hexafluorometallic acid (B) to the urethane resin (C) is 1.0 to 5.0, and a content of vanadium compound (D) is 0.01 to 5.0 mass % with respect to a total solid content of the surface treatment composition for coated steel sheet.

(3) The surface treatment composition for coated steel sheet according to (1) or (2), wherein the urethane resin (C) has polycarbonate structural units and polyether structural units.

(4) The surface treatment composition for coated steel sheet according to any one of (1) to (3), wherein the hexafluorometallic acid (B) is selected from hexafluorozirconic acid, hexafluorotitanic acid, and mixtures thereof.

(5) A surface-treated plated steel sheet comprising plated steel sheet on at least one surface of which is provided a 0.01 to 0.5 g/m² surface treatment layer formed by using the surface treatment composition for coated steel sheet according to any of (1) to (4).

(6) The surface-treated steel sheet according to (5), wherein the plated steel sheet is selected from hot dip zinc alloy-plated steel sheet containing 55% of Al and 1.6% of Si; Zn—Al—Mg—Si—Cr—Ca(Sr) alloy plated steel sheet with a plating layer comprised of, by mass %, Al: 25 to 75%, Mg: 0.1 to 10%, Si: 1 to 7.5%, Cr: 0.05 to 5.0%, and at least one of Ca and Sr: 0.001 to 0.5% and having a balance of Zn and unavoidable impurities; and Zn—Al—Mg—Si alloy plated steel sheet having a plating layer comprised of, by mass %, Al: 2 to 19%, Mg: 1 to 10%, and Si: 0.01 to 2%, and having a balance of Zn and unavoidable impurities.

(7) A coated plated steel sheet comprising plated steel sheet on at least one surface of which are provided, in order,
a surface treatment layer which includes the surface treatment composition for coated steel sheet according to any one of (1) to (4),
a primer layer, and
a top layer which contains a colored pigment,
wherein,
the primer layer contains a resin having one or more functional groups which can react with the primary amino groups of the organic silicon compound (A) and has a rust-proofing pigment.

(8) The coated plated steel sheet according to (7), wherein the plated steel sheet is selected from hot dip zinc alloy-plated steel sheet containing 55% of Al and 1.6% of Si; Zn—Al—Mg—Si—Cr—Ca(Sr) alloy plated steel sheet with a plating layer comprised of, by mass %, Al: 25 to 75%, Mg: 0.1 to 10%, Si: 1 to 7.5%, Cr: 0.05 to 5.0%, and at least one of Ca and Sr: 0.001 to 0.5%, and having a balance of Zn and unavoidable impurities; and Zn—Al—Mg—Si alloy plated steel sheet having a plating layer comprised of, by mass %, Al: 2 to 19%, Mg: 1 to 10%, and Si: 0.01 to 2%, and having a balance of Zn and unavoidable impurities.

(9) A method for producing surface treated plated steel sheet, the method comprising a surface treatment step; coating the surface treatment composition for coated steel sheet according to any one of (1) to (4) on at least one surface of plated steel sheet and,
heating and drying the surface treatment composition to form a surface treatment layer on the surface of the plated steel sheet, without rinsing.

(10) A method for producing a coated plated steel sheet, the method further comprising, after the surface treatment step according to claim 9, a step of coating a primer composition on the surface-treated plated steel sheet and heating and drying the primer composition to form a primer layer, and a step of applying a top coating composition on the primer layer, then heating and drying the top coating composition to form a top layer.

Advantageous Effects of Invention

The coated plated steel sheet of the present invention having a surface treatment layer formed using the aqueous surface treatment composition for coated steel sheet of the present invention is excellent in overhang corrosion resistance regardless of the surface treatment layer not containing chrome, so enables the environmental load of the coated steel sheet used in the field of building materials to be remarkably lightened. Therefore, the present invention has extremely great industrial value.

BRIEF DESCRIPTION OF DRAWINGS

FIG. 1 shows an exposure frame used for an overhang exposure test.

DESCRIPTION OF EMBODIMENTS

Below, details of the present invention will be explained. The aqueous surface treatment composition for coated steel sheet of the present invention comprises an organic silicon compound (A), hexafluorometallic acid (B), urethane resin (C), vanadium compound (D), and aqueous medium (E) as essential ingredients The organic silicon compound (A) used in the present invention has primary amino groups. The organic silicon compound (A) is selected from hydrolyzed products and hydrolyzed condensates of aminosilane compounds and mixtures of the same. The organic silicon compound (A) is the film-forming ingredient and contributes to adhesion of the surface treatment layer with the metal material and adhesion with the upper layer.

The silanol groups (—Si—OH) produced by hydrolysis of an aminosilane compound form strong chemical bonds of —Si—O-M through the metal material M and oxygen atom. Further, the end organic groups, that is, the primary amino groups, are high in activity, whereby an adsorption action occurs with the metal material M, so excellent adhesion with the metal material M is realized. Further, due to the reaction by the organic functional groups and primary amino groups of the resin (primer layer) contained in the upper layer or the hydrogen bonding action, excellent adhesion with the upper layer is realized. Such an action and effect of the organic silicon compound (A) are not obtained with epoxysilane coupling agents having glycidyl groups at their ends or vinylsilane coupling agents having vinyl groups and are only obtained by aminosilane coupling agents having primary amino groups.

As the organic silicon compound (A), 3-aminopropyltrimethoxysilane, 3-aminopropyltriethoxysilane, 3-aminopropylmonomethyldiethoxysilane, N-(2-aminoethyl)aminopropyltrimethoxysilane, N-(2-aminoethyl)aminopropylmethyl-dimethoxysilane, N-(2-aminoethyl)aminopropyltriethoxysilane, N-(2-aminoethyl)aminopropylmethyldiethoxysilane, etc. may be mentioned. Among these, 3-aminopropyltrimethoxysilane, 3-aminopropyltriethoxysilane, and 3-aminopropylmonomethyldiethoxysilane are preferable. These compounds may be used as single types alone or may be used as two types or more combined.

The hexafluorometallic acid (B) used in the present invention contributes to the adhesion of the surface treatment layer with the metal material and the acid resistance, alkali resistance, and corrosion resistance. In the process of formation of the film of the aqueous surface treatment composition of the present invention, the rise in pH accompanying the etching reaction near the metal material surface causes the fluorine of the hexafluorometallic acid (B) to disassociate and bond with the silicon compound (A) or urethane resin (C) whereby a dense composite compound film is formed by precipitation at the metal material surface. This precipitated film is believed to exhibit an excellent barrier effect against corrosive factors and to contribute to the chemical resistance and corrosion resistance. Further, by making the hexafluorometallic acid (B) approach the primary amino groups of the organic silicon compound (A) in the aqueous medium by the ion-like force, at the time of film formation, the primary amino groups of the organic silicon compound are preferentially adsorbed at the metal ingredients derived from the hexafluorometallic acid (metal oxides and hydroxides), while condensation of the silanol groups of the organic silicon compound proceeds well and a dense film structure is formed. As a result, dissolution of the organic silicon compound (A) in an acid or alkali environment is suppressed, so adhesion is maintained and improvement of the corrosion resistance is contributed to.

As the hexafluorometallic acid (B), hexafluorozirconic acid, hexafluorotitanic acid, hexafluorosilicic acid, etc. may be mentioned. Among these, hexafluorozirconic acid and hexafluorotitanic acid are preferable. These compounds may be used as single types alone or as two types or more combined.

In the surface treatment composition of the present invention, a ratio [$MF_6/NH_2$] of the number of moles of the hexafluorometallic acid ($MF_6$) (B) to the number of moles of primary amino groups ($NH_2$) of the silicon compound (A) is preferably 0.2 to 0.4, more preferably 0.3 to 0.4. If less than 0.2, the acid resistance and the alkali resistance sometimes fall, while if over 0.4, the working adhesion sometimes falls.

The urethane resin (C) provides miscibility stability with the organic silicon compound (A). The urethane resin (C) contains cationic groups represented by the following general formula [I].

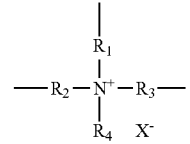

[where, $R_1$ to $R_3$ represent, mutually independently, $C_1$ to $C_6$ alkyl groups or $C_2$ to $C_{10}$ alkylene groups, $R_4$ represents a hydrogen atom or $C_1$ to $C_6$ alkyl group, and $X^-$ represents an anionic counter ion]

The urethane resin (C) is the film forming ingredient of the surface treatment layer and imparts flexibility and strong toughness to the surface treatment layer to thereby realize excellent working adhesion. Further, it complexly entangles with the organic silicon compound (A) and hexafluorometallic acid (B) to form a dense film and thereby realize acid resistance, alkali resistance, and corrosion resistance.

The amount of the cationic groups which the urethane resin (C) contains is 0.03 to 0.15 mol/kg in range while the total amine value of the urethane resin (C) is 1 to 10 mgKOH/g. The amount of the cationic groups and the total amine value contribute to the stability of aqueous dispersion of the urethane resin (C) and the miscibility with other ingredients. Further, by prescribing the amount of cationic groups and total amine value as the above ranges, it is possible to secure the storage stability as a surface treatment composition while improving the acid resistance and alkali resistance of the surface treatment layer formed. As a result, an excellent overhang corrosion resistance is realized. If the cationic groups are less than 0.03 mol/kg, the storage stability of the surface treatment composition falls. On the other hand, if the cationic groups exceed 0.15 mol/kg, a sufficient overhang corrosion resistance cannot be obtained. The preferable range of the cationic groups is 0.06 to 0.12 mol/kg. If the total amine value is less than 1 mgKOH/g, the storage stability of the surface treatment composition falls. On the other hand, if the total amine value exceeds 10 mgKOH/g, a sufficient overhang corrosion resistance cannot be obtained. The preferable range of the total amine value is 1 to 5 mgKOH/g.

In the urethane resin having the cationic groups (C), the monomer ingredients formed, that is, the polyols, polyisocyanate, and the method of polymerization are not particularly limited. For example, it is possible to obtain this resin by selecting the individual materials and ratios of use of the polyester polyol, polyether polyol, polycarbonate polyol, or other polyol, aliphatic, alicyclic, or aromatic diisocyanate or other diisocyanate, and compound having two or more hydroxyl groups or amino groups and one or more tertiary amine and/or quaternary ammonium groups usually used for production of a urethane resin so that the content of the cationic groups of the obtained urethane resin (C) falls in the above predetermined range and thereby cause polycondensation in methylethylketone or another inert organic solvent to obtain a urethane prepolymer and make it react with formic acid, acetic acid, or other acid or dimethyl sulfuric acid or other cationating agent to thereby quaternize part of the tertiary amino groups.

As the polyester polyol, one obtained by a direct esterification reaction and/or ester exchange reaction between a low molecular weight polyol and a polyvalent carboxylic acid or its ester, anhydride, halide, etc. or one obtained by condensation polymerization of a lactone or a hydroxycarboxylic acid compound obtained by hydrolysis and opening of the same may be mentioned.

As the low molecular weight polyol used for production of the polyester polyol, for example, ethyleneglycol, diethyleneglycol, triethyleneglycol, 1,2-propyleneglycol, 1,3-propyleneglycol, neopentylglycol, 1,2-butyleneglycol, 1,3-butyleneglycol, 1,4-butyleneglycol, hexamethyleneglycol, bisphenol A, hydrated bisphenol A, trimethylol propane, 1,2-propanediol, 1,3-propanediol, 2-methyl-1,3-propanediol, 2-butyl-2-ethyl-1,3-propanediol, 1,4-butanediol, neopentylglycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, 1,10-decanediol, and other aliphatic diols; trimethylolethane, trimethylolpropane, hexitols, pentitols, glycerin, diglycerin, polyglycerin, pentaerythritol, dipentaerythritol, tetramethylolpropane, and other trivalent or other aliphatic or alicyclic alcohols etc. may be mentioned.

As the polyvalent carboxylic acid used for the production of the polyester polyols, for example, oxalic acid, malic acid, succinic acid, glutaric acid, adipic acid, pimelic acid, suberic acid, azelic acid, sebacic acid, dodecanic diacid, 2-methylsuccinic acid, 2-methyladipic acid, 3-methyladipic acid, 3-methylpentanoic diacid, 2-methyloctanoic diacid, 3,8-dimethyldecanoic diacid, 3,7-dimethyldecanoic diacid, dimer acid, hydrogenated dimer acid, and other aliphatic dicarboxylic acids; cyclohexanedicarboxylic acid and other alicyclic dicarboxylic acids; phthalic acid, isophthalic acid, terephthalic acid, naphthalenedicarboxylic acid, and other aromatic dicarboxylic acids; trimellitic acid, trimesic acid, trimers of castor oil aliphatic acids, and other tricarboxylic acids; pimelic acid, and other tetracarboxylic acids or higher polycarboxylic acids may be mentioned. As the ester-forming derivatives of polyvalent carboxylic acids, acid anhydrides, halides (chlorides, bromides, etc.), esters having lower aliphatic alcohols (methyl ester, ethyl ester, propyl ester, isopropyl ester, butyl ester, isobutyl ester, amyl ester, etc.) of these polyvalent carboxylic acids etc. may be mentioned.

As the lactone used for production of the polyester polyol, γ-caprolactone, δ-caprolactone, ε-caprolactone, γ-valerolactone, δ-valerolactone, etc. may be mentioned.

As the polyether polyol, for example, ethyleneglycol, diethyleneglycol, triethyleneglycol, and other ethylene oxide adducts, propyleneglycol, dipropyleneglycol, tripropyleneglycol, and other propylene oxide adducts, ethylene oxide and/or propylene oxide adducts of the above polyols, polytetramethyleneglycol, etc. may be mentioned.

As the polycarbonate polyol, for example, one obtained by causing carbonic acid and a fatty acid polyol to react by esterification etc. can be used. Specifically, ones obtained by causing 1,3-propanediol, 1,4-butanediol, 1,6-hexanediol, diethyleneglycol, polyethyleneglycol, propyleneglycol, cyclohexanedimethanol, and other diols and dimethylene carbonate, or diphenyl carbonate, phosgene, etc. to react may be mentioned.

As the polyisocyanate, for example, tetramethylene diisocyanate, hexamethylene diisocyanate, lysine diisocyanate ester, hydrogenated xylylene diisocyanate, 1,4-cyclohexylene diisocyanate, 4,4'-dicyclohexylmethane diisocyanate, 2,4'-dicyclohexylmethane diisocyanate, isophoron diisocyanate, 3,3'-dimethoxy-4,4'-biphenylene diisocyanate, 1,5-naphthalene diisocyanate, 1,5-tetrahydronaphthalene diisocyanate, 2,4-tolylene diisocyanate, 2,6-tolylene diisocyanate, 4,4'-diphenylmethane diisocyanate, 2,4'-diphenylmethane diisocyanate, phenylene diisocyanate, xylylene diisocyanate, tetramethylxylylene diisocyanate, etc. may be mentioned. Among these, as the more preferable ones, tetramethylene diisocyanate, hexamethylene diisocyanate, lysine diisocyanate ester, hydrogenated xylylene diisocyanate, 1,4-cyclohexylene diisocyanate, 4,4'-dicyclohexylmethane diisocyanate, 2,4'-dicyclohexylmethane diisocyanate, isophoron diisocyanate, etc. may be mentioned.

As the compound having two or more hydroxyl groups or amino groups and one or more tertiary amine and/or quaternary ammonium groups, for example, N,N-dimethylethanolamine, N-methyldiethanolamine, N,N-dimethylethylenediamine, etc. may be mentioned. Further, a N,N,N-trimethylolamine or N,N,N-triethanolamine having tertiary amines may also be used. Among these, a polyhydroxy compound having a tertiary amino group and contains two or more active hydrogens having reactivity with isocyanate groups is preferable.

The urethane resin (C) preferably has polycarbonate structural units and polyether structural units. If having both structures, it is possible to obtain the hydrolysis resistance derived from the polyether structures without the flexibility derived from the polycarbonate structural units being impaired, so it is possible to form a film excellent in working adhesion and chemical resistance.

A solid content mass ratio [(A+B)/C] of the total of the organic silicon compound (A) and the hexafluorometallic acid (B) to the cationic urethane resin (C) is preferably 1.0 to 5.0, more preferably 1.0 to 3.0. If less than 1.0, the acid resistance and the alkali resistance sometimes fall, while if over 5.0, the working adhesion sometimes falls.

The vanadium compound (D) contributes to the corrosion resistance as an elution inhibitor (corrosion suppressing substance). In edge creep, at the cut end face parts and under the coating layer, a sacrificial corrosion action causes an anode dissolving reaction to occur at the plating layer, but at that time, the vanadium compound contained in the surface treatment layer is eluted, a corrosion product is formed with the zinc, aluminum, etc. eluted from the plating layer, and the plating surface layer is passivated, whereby progression of corrosion is suppressed. As the vanadium compound (D), vanadium pentaoxide, metavanadic acid $HVO_3$, ammonium metavanadate, vanadium oxytrichloride $VOCl_3$, vanadium trioxide $V_2O_3$, vanadium dioxide, vanadium oxysulfate $VOSO_4$, vanadium oxyacetyl acetonate $VO(OC(=CH_2)CH_2COCH_3)_3$, vanadium acetyl acetonate $V(OC(=CH_2)CH_2COCH_3)_3$, vanadium trichloride $VCl_3$, etc. may be mentioned.

The content of the vanadium compound (D) is preferably 0.01 to 5.0 mass % with respect to the total solid content of the surface treatment composition for coated steel sheet, more preferably 0.1 to 1.0 mass %. If less than 0.01 mass %, the effect on the corrosion resistance sometimes becomes lower, while if over 5.0 mass %, the acid resistance and the alkali resistance sometimes fall.

The aqueous medium (E) is usually water, but for the purpose of improving the dryability of the surface treatment layer obtained etc., a small amount (for example, 10 vol % or less of the entire aqueous medium) of an alcohol, ketone, or a cellosolve-based water-soluble organic solvent may be jointly used. In this way, the surface treatment composition of the present invention for coated steel sheet is an aqueous surface treatment composition having a main solvent of water.

The aqueous surface treatment composition of the present invention may further contain as optional ingredients a surfactant for improving the wettability, a defoaming agent for suppressing bubbles, etc. so as to form a more uniform surface treatment layer within a range not impairing the storage stability of the aqueous surface treatment composition or the effect of the present invention.

The pH of the aqueous surface treatment composition of the present invention is not particularly limited so long as the effect of the present invention can be achieved, but is preferably 4 to 10 in range, more preferably 5 to 7 in range. If the pH is less than 4 or is more than 10, the storage stability tends to fall. If adjustment of the pH is necessary, ammonia, dimethylamine, triethylamine, or other alkali ingredient or acetic acid, phosphoric acid, or other acid ingredient may also be added.

The solid content concentration of the aqueous surface treatment composition of the present invention is not particularly limited so long as the effect of the present invention can be achieved, but 1 to 20 mass % in range is preferable. If the solid content concentration is less than 1%, the amount of film targeted becomes difficult to obtain, while if over 20%, the storage stability of the aqueous surface treatment composition can no longer be secured.

The aqueous surface treatment composition of the present invention is produced by adding the organic silicon compound (A), hexafluorometallic acid (B), urethane resin (C), vanadium compound (D), and other optional ingredients as needed to the aqueous medium (E) and stirring the mixture. The order of addition of the ingredients is not particularly limited, but the order of successively adding the organic silicon compound (A) and the hexafluorometallic acid (B) to obtain a neutralized mixture, then adding the urethane resin (C) is preferable since no drop in miscibility due to pH shock is invited.

The reason why using the aqueous surface treatment composition of the present invention enables a surface treatment layer securing sufficient working adhesion while imparting excellent overhang corrosion resistance is believed to be as follows, but the present invention and the effect of the present invention should not be limitatively interpreted based on this belief.

The corrosion at the end face parts of a coated plated steel sheet in outdoor exposure (including overhang environments) (edge creep) first proceeds due to the anodic dissolution reaction due to the sacrificial corrosion action at the plating layer of the cut end face parts and the cathodic reaction due to oxidation reduction at the exposed metal material. Next, if the corrosion product covers the exposed parts of the end faces to thereby inhibit corrosion, the cathode part moves to the surface of the plating layer under the coating layer near the edge parts. Further, the penetrating moisture or oxygen and corrosive ions reach the surface of the plating layer whereupon a cathodic reaction proceeds and alkali concentration occurs. Due to this, the plating layer and the surface treatment layer are invaded. The corrosion products of the plating ingredients formed there build up at the coating layer/plating interface resulting in coating layer blisters. At the same time, a new anode part (concentrated acid environment) is formed near the blisters, and corrosion increases in speed. An overhang environment becomes a more severe corrosive environment than a general outdoor exposure environment since the air-borne sea salt particles and other corrosive factors remain for a long period of time without being washed away. In such a corrosive environment of coated plated steel sheet, the corrosion resistance of the surface treatment layer is believed to be realized since even at the concentrated acid environment of the anode part and the concentrated alkali environment of the cathode part, adhesion with the plating layer or the primer layer can be maintained without the surface treatment layer being invaded, that is, the film is strong in acid resistance and alkali resistance.

The aqueous surface treatment composition of the present invention includes an organic silicon compound, hexafluorometallic acid, urethane resin, vanadium compound, and aqueous medium. The actions of the different ingredients are as explained above. Here, the action of the urethane resin (C) used in the present invention will be explained in detail. The inventors engaged in repeated studies for the purpose of improving the corrosion resistance of the surface treatment layer and as a result discovered that the amount of cationic groups and total amine value of the urethane resin are strongly involved with the acid resistance and alkali resistance of the formed film and further the overhang corrosion resistance.

The total amine value of the urethane resin becomes an indicator of the amount of functional groups derived from compounds having tertiary amine and/or quaternary ammonium groups introduced into the urethane resin. These functional groups impart hydrophilicity to the film. Their presence becomes a factor for dissolution of the formed film in a concentrated acid environment or concentrated alkali environment in corrosion under a coating layer. In the present invention, the inventors discovered that by controlling the total amine value of the urethane resin to become a far lower 1 to 10 mgKOH/g than in the prior art, a more excellent corrosion resistance can be realized.

However, other issues arise if making the total amine value of the urethane resin extremely low. If the total amine value is low, the dispersibility of the urethane resin in an aqueous medium, the miscibility of the essential ingredients of the present invention constituted by the organic silicon compound (A) having primary amino groups and the hexafluorometallic acid (B), and storage stability become difficult to obtain. Therefore, the amount of cationic groups of the urethane resin of the present invention has to be controlled to 0.03 to 0.15 mol/kg. By imparting an ionic property to the introduced tertiary amine and/or quaternary ammonium groups, due to the electrostatic repulsion action of the ions, aqueous dispersibility and miscibility with other ingredients are obtained. If imparting more of an ionic property than necessary, the chemical resistance and corrosion resistance of the formed film fall, so there is an optimal range. Further, if the total amine value of the urethane resin is low, the polar groups contained in the resin become small, so the working adhesion of the formed film tends to fall. For this reason, the ratio [(A+B)/C] of the organic silicon compound (A) and the hexafluorometallic acid (B) to the urethane resin (C) of the present invention is preferably optimized and the content of the primary amino groups derived from an organic silicon compound in the film formed is preferably raised so as to secure the working adhesion. By using the thus designed aqueous surface treatment composition, it is believed to become possible to form a surface treatment layer giving an extremely excellent acid resistance or alkali resistance and further an overhang corrosion resistance which never existed before.

Next, the surface treated plated steel sheet and coated plated steel sheet having the surface treatment layer formed using the aqueous surface treatment composition of the present invention will be explained.

As the treatable material of the plated steel sheet, hot dip galvanized steel sheet, galvanized steel sheet containing aluminum, electrogalvanized steel sheet, galvannealed steel sheet, zinc-nickel-plated steel sheet, zinc-cobalt-plated steel sheet, vapor deposition galvanized steel sheet, nickel-plated steel sheet, tin-plated steel sheet, and other generally known plated steel sheet can be used. Particularly preferable plated steel sheet include hot dip Zn—55% Al—1.6% Si alloy plated steel sheet (product name: "Galvalume steel sheet"), Zn—Al—Mg—Si—Cr—Ca(Sr) alloy plated steel sheet having a plating layer comprised of, by mass %, Al: 25 to 75%, Mg: 0.1 to 10%, Si: 1 to 7.5%, Cr: 0.05 to 5.0%, and at least one of Ca and Sr: 0.001 to 0.5% and has a balance of Zn and unavoidable impurities, and Zn—Al—Mg—Si alloy plated steel sheet having a plating layer comprised of, by mass %, Al: 2 to 19%, Mg: 1 to 10%, and Si: 0.01 to 2% and has a balance of Zn and unavoidable impurities. When using these aluminum-containing galvanized steel sheet, the passivation action of the corrosion products formed by the hexafluorometallic acid (B) and vanadium compound (D) contained in the surface treatment layer and the ingredients eluted from the plating layer becomes more remarkable. On top of this, due to the synergistic effect with the high corrosion resistance of the plating layer itself, an excellent overhang corrosion resistance can be realized.

Before the surface treatment by the aqueous surface treatment composition of the present invention, while not essential, usually the oil and dirt having adhered to the treatable metal material can be removed by washing by a degreasing agent, washing by hot water, washing by acid, washing by alkali, washing by a solvent, etc. suitably combined. Further, before treatment by the aqueous surface treatment composition of the present invention, the surface can be adjusted for the purpose of further improving the corrosion resistance of the metal material and the adhesion of the surface treatment film and metal material. The method of adjusting the surface is not particularly limited, but chemical treatment causing Fe, Co, Ni, Cu, Zn, Mn, Zr, Ti, V, or other metal to deposit on the surface of the plated steel sheet, chemical treatment by phosphate, etc. may be mentioned. In washing the surface of the metal material, the surface is preferably rinsed after washing so that the washing agent does not remain at the surface of the metal material.

The surface treated plated steel sheet of the present invention is produced by a method of production including a step of coating the plated steel sheet with the aqueous surface treatment composition of the present invention, then heating it to dry without rinsing to thereby forming a surface treatment layer at the surface.

The method of application is not particularly limited. For example, the roll coater method, dipping method, spray method, bar coat method, etc. may be mentioned. Further, the temperature of the surface treatment composition at the time of application is not particularly limited, but 10 to 40° C. is preferable. The drying method is not particularly limited. Drying by heating using hot air; drying by a blowing air, a hot air furnace, an induction heating furnace, an electric furnace, etc. may be mentioned, but drying by heating by a hot air furnace, induction heating furnace, electric furnace, etc. is preferable. Further, the peak temperature of the steel sheet at the time of drying is not particularly limited, but is preferably 70 to 150° C.

The film mass of the surface treatment layer formed at the surface treated plated steel sheet of the present invention has to be 0.01 to 0.5 g/m$^2$, is preferably 0.01 to 0.2 g/m$^2$, and is more preferably 0.01 to 0.1 g/m$^2$. If the film mass is less than 0.01 g/m$^2$, the effect of the surface treatment layer can no longer be obtained, while if over 0.5 g/m$^2$, the formed film easily suffers from cohesive failure and the working adhesion falls.

The coated plated steel sheet present invention is produced by a method of production including, after the above surface treatment step, a coating step of further coating a primer composition and heating it to dry to form a primer layer and a step of applying a top coating composition over the primer layer, then heating it to dry to cause the formation of a top layer. The methods of application of the primer composition and top coating composition are not particularly limited. For example, the roll coater method, dipping method, spray method, bar coat method, etc. may be mentioned. Further, the coating composition temperature at the time of application is not particularly limited, but 10 to 40° C. is preferable. Further, the drying conditions are not particularly limited. Drying by air flow, drying by heating using a hot air furnace, induction heating furnace, electric furnace, etc. may be mentioned, but drying by heating by a hot air furnace, induction heating furnace, electrical furnace, etc. is preferable. The heating and drying conditions are not particularly limited. For example, they may be made 130 to 250° C. and a time of 10 seconds to 5 minutes. The peak temperature of the steel sheet at the time of drying is also not limited, but 170 to 250° C. is preferable.

The primer layer formed at the coated plated steel sheet of the present invention preferably has a dried thickness of 2 to 10 μm. If less than 2 μm, a sufficient corrosion resistance cannot be obtained, while if over 10 μm, the working adhesion tends to fall. Further, the top layer preferably has a dried thickness of 5 to 30 μm. If less than 5 μm, a uniform colored appearance becomes difficult to obtain and the corrosion resistance also cannot be sufficiently obtained. Further, if over 30 μm, the working adhesion falls and the cost becomes disadvantageous.

As the primer composition, a resin having functional groups able to react with the primary amino groups of the organic silicon compound (A) contained in the aqueous surface treatment composition and a chromate-free primer containing a rust-proofing pigment other than a chrome-based system can be used. The above resin may be of any form such as an aqueous form, solvent-based form, powder-based form, etc.

The functional groups able to react with the primary amino groups of the organic silicon compound (A) in the resin of the primer composition react with the primary amino groups derived from the organic silicon compound (A) included in the surface treatment layer in the film-forming step of the primer composition to thereby cause the surface treatment layer and the primer layer to strongly bond and contribute to realization of excellent adhesion between the surface treatment layer and the primer layer. As the above functional groups, carboxyl groups, epoxy groups, aldehyde groups, ketone groups, etc. may be mentioned. If having these functional groups, the type of the resin is not limited. A polyacryl-based resin, polyolefin-based resin, polyurethane-based resin, epoxy-based resin, polyester-based resin, polybutyral-based ersin, melamine-based resin, fluorine-based resin, etc. can be used. These may be used alone or as two types or more combined.

The rust-proofing pigment contained in the primer composition improves the environmental barrier property of the primer layer and also gradually elutes in a corrosive environment to form insoluble corrosion products with the ingredients eluted from the plating layer and the ingredients eluted from the surface treatment layer and to protect the corroded parts, so exhibits a long term corrosion inhibiting effect. As the above rust-proofing pigment, generally known chromate-free ones, for example, zinc phosphate, iron phosphate, aluminum phosphate, magnesium phosphate, or other phosphoric acid-based rust-proofing pigments, calcium molybdate, aluminum molybdate, barium molybdate, or other molybdic acid-based preventive pigments, vanadium oxide, calcium vanadate, or other vanadium-based rust-proofing pigments, aqueous dispersion silica, fumed silica, or other particulate silica etc. can be used. Further, a defoaming agent, dispersion aid, diluents for lowering the coating composition viscosity, or other additive can be suitably mixed in.

The top coating composition is not particularly limited so long as one containing a resin and a coloring pigment. Any usual top coating composition for coating use can be used. As the coloring pigment, known inorganic and organic coloring pigments can be used. For example, as inorganic coloring pigments, titanium oxide ($TiO_2$), zinc oxide (ZnO), zirconium oxide ($ZrO_2$), calcium carbonate ($CaCO_3$), barium sulfate ($BaSO_4$), alumina ($Al_2O_3$), kaolin clay, carbon black, iron oxide ($Fe_2O_3$, $Fe_3O_4$), etc. may be mentioned, while as organic coloring pigments, hansa yellow, pyrazolone orange, azo pigments, etc. may be mentioned.

EXAMPLES

The following examples will be used to explain the present invention more specifically, but the present invention is not limited to these examples.

Preparation of Aqueous Surface Treatment Composition

1. Surface Treatment Composition

Example Nos. 1 to 35

In accordance with each of the combinations and ratios of materials shown in Table 1, an aqueous surface treatment composition was prepared. An aminosilane compound was added to deionized water and the mixture stirred for 5 minutes, then hexafluorometallic acid was added and the mixture stirred for 10 minutes to obtain a neutralized product. Next, a urethane resin and vanadium compound were successively added and the mixture stirred for 10 minutes to enable sufficient mixing to thereby obtain an aqueous surface treatment composition. Deionized water was added to adjust the solid content concentration to 7 mass %.

Urethane Resin which has Cationic Groups (C)
(1) Polyether-Based Urethane Resin Emulsion (C1)

Polyether polyol obtained from 1,4-cyclohexylglycol (below, referred to as the "polyether A"): 120 parts by mass, 1,4-cyclohexane bismethylisocyanate: 100 parts by mass, N-methyldiethanolamine: 10 parts by mass, and trimethylolpropane: 5 parts by mass were held in N-methyl-2-pyrrolidone: 100 parts by mass at 70° C. while causing a reaction to obtain a urethane prepolymer. To this, dimethyl sulfate: 3 parts by mass was added and the mixture reacted at 50° C. for 60 minutes to obtain a cationic urethane prepolymer. Next, deionized water was added and the mixture made to uniformly emulsify and disperse, then the N-methyl-2-pyrrolidone was recovered to obtain a cationic polyurethane resin emulsion.

(2) Polycarbonate-Based Urethane Resin Emulsion (C2)

Except for using a polyol constituted by a polycarbonate polyol obtained from 1,4-cyclohexane dimethanol and a polycarbonatediol obtained from diphenyl carbonate (below, referred to as the "polycarbonate A"): 120 parts by mass, synthesized in same way as C1.

(3) Polyester-Based Urethane Resin Emulsion (C3)

Except for using a polyol constituted by a polyester polyol obtained from 1,4-cyclohexylglycol and adipic acid (below, referred to as the "polyester A"): 120 parts by mass, synthesized in same way as C1.

(4) Polyether/Polycarbonate-Based Urethane Resin Emulsion (C4)

Except for using a polyol constituted by polyether A: 84 parts by mass and polycarbonate A: 36 parts by mass, synthesized in same way as C1.

(5) Polyether/Polycarbonate-Based Urethane Resin Emulsion (C5)

Except for using a polyol constituted by a polyether polyol obtained from tetramethyleneglycol (below, referred to as the "polyether B"): 84 parts by mass and polycarbonate A: 36 parts by mass, synthesized in same way as C1.

(6) Polyether/Polycarbonate-Based Urethane Resin Emulsion (C6)

Except for using a polyol constituted by the polyether A: 84 parts by mass and a polycarbonate polyol obtained from 1,6-hexanediol and diphenylcarbonate (below, referred to as the "polycarbonate B"): 36 parts by mass, synthesized in same way as C1.

(7) Polyether/Polycarbonate-Based Urethane Resin Emulsions (C7 to 16)

Except for using the combinations and amounts of the polyols, isocyanates, introduced amines, and cationic ingredients shown in Table 2, synthesized in same way as C1. C13 and C16 are poor in emulsification and failed to form emulsions so were poor in aqueous dispersion ability.

Properties of Cationic Urethane Resin (C) Amount of Cationic Groups of Cationic Urethane Resin (C) The value calculated by the following calculation formula from the amounts of the ingredient materials charged when synthesizing the urethane resin emulsion is defined as the amount of the cationic groups. The amounts of the cationic groups of the obtained urethane resin emulsions are shown in Table 3.

$$\text{Amount of cationic groups (mol/kg)} = [(G_4)/(G_1+G_2+G_3+G_4)]/H_4 \times 1000$$

where:

$G_1$: amount of polyol charged (g)

$G_2$: amount of isocyanate charged (g)

$G_3$: amount of compound having two or more hydroxyl groups or an amino group and one or more tertiary amine and/or quaternary ammonium groups charged (g)

$G_4$: amount of neutralizing acid and/or cationating agent charged (g)

$H_4$: molecular weight of neutralizing acid and/or cationating agent charged (g/mol)

Total Amine Value

The value measured by the following measurement method was defined as the "total amine value". The total amine value of each obtained urethane resin emulsion is shown in Table 3.

About 3 g of the urethane resin emulsion converted to solid content was sampled and dissolved by addition of dimethylformamide. Next, several drops of a Bromocresol Green indicator were added. This was titrated by a 0.1 mol/liter hydrochloric acid titration use solution. The point where the color changed from blue to yellow was deemed the end point. The amount of the titration solution was read from there. The following calculation formula was used to calculate the total amine value (mgKOH/g):

$$\text{Total amine value} = [(F_1 - F_2) \times f \times 5.611/S]$$

where:

$F_1$: amount of 0.1 mol/liter hydrochloric acid titration use solution required for test (ml)

$F_2$: amount of 0.1 mol/liter hydrochloric acid titration use solution required for blank test (ml)

f: titer of 0.1 mol/liter hydrochloric acid titration use solution

S: amount of sample take (g)

2. Surface Treatment Composition (Comparative Example Nos. 36 to 39)

The following aqueous surface treatment compositions described in the examples of the PLT 1 to 4 were prepared.

(1) Aqueous Surface Treatment Composition (No. 36)

To pure water: 1 liter, Sila-Ace S-330 (γ-aminopropyltriethoxysilane, made by Chisso Corporation): 1.5 g was added. The mixture was stirred at room temperature for 5 minutes, then Snowtex N (aqueous dispersion silica: made by Nissan Chemical Industries): 0.5 g was added and the mixture stirred for 5 minutes. Further, Zircosol AC-7 (zirconyl ammonium carbonate: made by Daiichi Kigenso Kagaku Kogyo) was added in 0.02 g converted to zirconium ions and the mixture stirred for 5 minutes to obtain an aqueous surface treatment composition (No. 36).

(2) Aqueous Surface Treatment Composition (No. 37)

Synthesis of Polyurethane Resin

A polyether polyol (synthesis ingredients: polytetramethyleneglycol and ethyleneglycol, molecular weight 1500): 150 parts by mass, trimethylolpropane: 6 parts by mass, N-methyl-N,N-diethanolamine: 24 parts by mass, isophoron diisocyanate: 94 parts by mass, and methylethylketone: 135 parts by mass were charged in a reaction vessel and held there at 70 to 75° C. while causing a reaction to obtain a urethane prepolymer. To this, dimethyl sulfuric acid: 15 parts by mass was added and the mixture allowed to react at 50 to 60° C. for 30 to 60 minutes to obtain a cationic urethane prepolymer. Further, water: 576 parts by mass was added to the cationic urethane prepolymer. The mixture was uniformly emulsified, then the methylethylketone was recovered to obtain an aqueous dispersion of a cationic polyether-based urethane resin. The amount of cationic groups of the urethane resin was 0.42, while the total amine value was 30.

In deionized water, the above polyurethane resin: 50 parts by mass (as weight of solid content), γ-aminopropyltriethoxysilane: 100 parts by mass, titanium hydrofluoric acid: 21 parts by mass, and vanadium oxyacetyl acetonate: 7 parts by mass were successively mixed to obtain an aqueous surface treatment composition (No. 37).

(3) Aqueous Surface Treatment Composition (No. 38)

Synthesis of Polyurethane Resin

"Jeffamine M-2070" (product name, made by Huntsman): 200 parts by mass and glycerin carbonate: 11.8 parts by mass were added and stirred at 100° C. for 1 hour to obtain a polyether amine-modified glycerin carbonate. Next, "Bisol 3PN" (product name, made by Toho Chemical Industry): 59.5 parts by mass, "Bisol 6PN" (product name, made by Toho Chemical Industry): 85.7 parts by mass, methyldiethanolamine: 21.1 parts by mass, and the above polyether amine-modified glycerin carbonate: 53.0 parts by mass were dissolved in N-methyl pyrrolidone: 66.2 g, then hexamethylene diisocyanate: 67.3 parts by mass was added dropwise over 30 minutes and a reaction caused at 60° C. for 1.5 hours. After that, the temperature was raised to 80° C. and a reaction performed for 2 hours, then isophoron diisocyanate: 44.4 g parts by mass was added and a reaction further performed at 80° C. for 3 hours. After that, methylethylketone: 154.4 parts by mass was added and the mixture cooled to 40° C. to obtain a prepolymer. Next, the above prepolymer was neutralized by 89% phosphoric acid aqueous solution: 6.5 parts by mass, was dispersed by addition of deionized water: 772.0 parts by mass, then was raised in temperature to 70° C. and held there for 1 hour. After this, at 60° C., the methylethylketone was distilled off in vacuo to thereby obtain an aqueous dispersion of polyurethane resin. The amount of cationic groups of the urethane resin was 0.18, and the total amine value was 15.

In deionized water, the above polyurethane resin: 100 parts by mass (as weight of solid content), phosphoric acid: 30 parts by mass, titanium hydrofluoric acid: 10 parts by mass, and γ-aminopropyltriethoxysilane: 30 parts by mass were successively mixed to obtain an aqueous surface treatment composition (No. 38).

(4) Aqueous Surface Treatment Composition (No. 39)

In deionized water, hexafluorotitanic acid: 55 parts by mass, hexafluorozirconic acid: 10 parts by mass, and aminomethyl-substituted polyvinylphenol: 72 parts by mass were successively mixed to obtain an aqueous surface treatment composition (No. 39).

3. Chromate Treatment (Comparative Example No. 40)

A coating chromate chemical ZM-1300AN (made by Nihon Parkerizing) was used. This example is an example of a chromate surface treatment composition of the prior art.

Preparation of Primer Composition (1) Primer Composition (P1)

An epoxy resin: 70 parts by mass, melamine resin: 10 parts by mass, zinc phosphate-based rust-proofing pigment: 5 parts by mass, magnesium phosphate-based rust-proofing pigment: 5 parts by mass, aluminum dihydrogen triphosphate: 5 parts by mass, and modified silica: 5 parts by mass were mixed to obtain the primer composition P1.

(2) Primer Composition (P2)

A polyester resin: 70 parts by mass, melamine resin: 10 parts by mass, zinc phosphate-based rust-proofing pigment: 5 parts by mass, magnesium phosphate-based rust-proofing pigment: 5 parts by mass, aluminum dihydrogen triphosphate: 5 parts by mass, and modified silica: 5 parts by mass were mixed to obtain the primer composition P2.

(3) Primer Composition (P3) Comparative Example

A urethane resin: 80 parts by mass, zinc phosphate-based rust-proofing pigment: 5 parts by mass, magnesium phosphate-based rust-proofing pigment: 5 parts by mass, aluminum dihydrogen triphosphate: 5 parts by mass, and modified silica: 5 parts by mass were mixed to obtain the primer composition P3.

(4) Primer Composition (P4) Comparative Example

An epoxy resin: 70 parts by mass, melamine resin: 10 parts by mass, and titanium oxide: 20 parts by mass were mixed to obtain the primer composition P4.

(5) Primer Composition (P5) Comparative Example

Referring to PLT 3, an epoxy resin: 55 parts by mass, magnesium phosphate-based rust-proofing pigment: 15 parts by mass, zinc phosphate-based rust-proofing pigment: 15 parts by mass, aluminum dihydrogen triphosphate: 2 parts by mass, modified silica: 3 parts by mass, titanium oxide: 5 parts by mass, and barium sulfate: 5 parts by mass were mixed to obtain the primer composition P5.

(6) Primer Composition (Cr) Comparative Example

An epoxy resin: 55 parts by mass, melamine resin: 5 parts by mass, strontium chromate-based rust-proofing agent: 20 parts by weight, zinc phosphate-based rust-proofing pigment: 5 parts by mass, magnesium phosphate-based rust-proofing pigment: 5 parts by mass, aluminum dihydrogen triphosphate: 5 parts by mass, and modified silica: 5 parts by mass were mixed to obtain the primer composition Cr.

Preparation of Top Coating Composition

Polyester resin: 60 parts by mass, butylated melamine resin: 15 parts by mass, titanium oxide: 10 parts by mass, and a coloring pigment: 15 parts by mass were mixed to obtain a top coating composition (T1).

Preparation of Test Sheets
1. As the plated steel sheets, the plated steel sheets shown below were used.
Hot dip Zn—55% Al—1.6% Si alloy plated steel sheet (below, symbol: G1)
Sheet thickness: 0.6 mm, plating deposition per surface: 75 g/m² (double sided plating)

Hot dip Zn—55% Al—2% Mg-1.6% Si—0.1% Cr—0.02% Ca alloy plated steel sheet (below, symbol: G2)
Sheet thickness: 0.6 mm, plating deposition per surface: 50 g/m² (double sided plating)
Hot dip Zn—11% Al—3% Mg—0.2% Si alloy plated steel sheet (below, symbol: G3)
Sheet thickness: 0.6 mm, plating deposition per surface: 50 g/m² (double sided plating)
Hot dip galvanized steel sheet (below, symbol: G4)
Sheet thickness: 0.6 mm, plating deposition per surface: 50 g/m² (double sided plating)

2. Pretreatment

An alkali degreasing agent FC-E6406 (made by Nihon Parkerizing) was used to create a bath of a concentration of 20 g/liter and temperature of 60° C. Each test material was sprayed for 10 seconds. Next, this was rinsed by tapwater, then was wiped by a roll and was dried by hot air.

3. Surface Treatment (1) Surface Treatment

In accordance with each combination shown in Table 4, the surface of the pretreated plated steel sheet was coated with an aqueous surface treatment composition by a bar coater to give a dried film amount shown in Table 4 ("Cr:" shows amount of deposition of Cr in g/m²). Next, a hot air dryer was used for heating this to dry to give a peak sheet temperature of 80° C.

4. Application of Primer Coating Composition

In accordance with each combination shown in Table 4, the surface treated plated steel sheet was coated with a primer composition by a bar coater to give a 5 μm dried thickness. Next, a hot air dryer was used for heating this to dry to give a 210° C. peak sheet temperature.

5. Application of Top Coating Composition

In accordance with each combination shown in Table 4, after forming the primer layer, a top coating composition was applied by a bar coater to give a 15 μm dried thickness. Next, a hot air dryer was used for heating this to dry to give a 220° C. peak sheet temperature.

Evaluation Tests

1. Working Adhesion (1) Primary Adhesion Test

Each test sheet was subjected to a OT bending test at 20° C. without an inside clearance plate interposed. The tape was peeled off, then the state of peeling of the coating layer was observed by the naked eye. The evaluation was conducted based on the following evaluation criteria.

Evaluation Criteria
VG: no peeling
G: peeling area less than 10%
F: peeling area 10% to less than 50%
P: peeling area 50% or more (2) Secondary Adhesion Test Each test sheet was immersed in boiling water for 2 hours, then was allowed to stand for 1 day and was evaluated in the same way as the primary adhesion test.

2. Corrosion Resistance (1) Composite Cycle Test

Each test sheet was scored at its coating film by a cutter down to the metal material. A composite cycle test prescribed in JASO M609-91 was conducted for 200 cycles. The width of a coating film blister from the cut part (largest value at one side) and the width of a coating film blister from a cut end face part (largest value) were measured. The evaluation was conducted based on the following evaluation criteria.

Evaluation Criteria—Cut Parts
VG: less than 2 mm
G: 2 mm to less than 5 mm
F: 5 mm to less than 10 mm
P: 10 mm or more
Evaluation Criteria—End Faces
VG: less than 2 mm
G: 2 mm to less than 5 mm
F: 5 mm to less than 10 mm
P: 10 mm or more (2) Outdoor Exposure Test Each test sheet was scored at its coating film by a cutter down to the metal material. At an exposure test site located about 5 m inland from the Pacific Coast of Nanjo city of Okinawa prefecture, an outdoor exposure test was conducted for about 3 years. The width of a coating film blister from the cut part (largest value at one side) and the width of a coating film blister from a cut end face part (largest value) were measured. The evaluation was conducted based on the following evaluation criteria.

Evaluation Criteria—Cut Parts
VG: less than 1 mm
G: 1 mm to less than 2 mm
F: 2 mm to less than 3 mm
P: 3 mm or more
Evaluation Criteria—End Faces
VG: less than 1 mm
G: 1 mm to less than 2 mm
F: 2 mm to less than 3 mm
P: 3 mm or more (3) Underhang Exposure Test Each test sheet was scored at its coating layer by a cutter down to the metal material. At an exposure test site located about 5 m inland from the Pacific Coast of Nanjo city of Okinawa prefecture, the test sheet was placed facing the ground at the back side of the exposure frame shown in FIG. 1, and an overhang exposure test was conducted for about 3 years. The evaluation was conducted in the same way as the outdoor exposure test.

3. Chemical Resistance (1) Alkali Resistance Test

Each test sheet was immersed in a 5 mass % sodium hydroxide aqueous solution at room temperature for 24 hours, then the sizes and density of formation of the blisters formed were observed by the naked eye. The alkali resistance was evaluated in accordance with the following evaluation criteria.

Evaluation Criteria
VG: no blisters
G: one blister of less than 1.0 mm and density of formation of F.
F: one blister of 1.0 mm or more and density of formation of F. Alternatively, one blister of size of less than 1.0 mm and density of formation of M.
P: one blister of size of 1 mm or more and density of formation of M. Alternatively, density of formation of D regardless of size of blisters.

The code letters used for the density of formation of blisters have the following meanings (see ASTM D714-56).
F: number of blisters formed small
M: number of blisters formed large
D: number of blisters formed very large (2) Acid Resistance Test Each test sheet was immersed in a 5 mass % sulfuric acid aqueous solution at room temperature for 24 hours, then the sizes and density of formation of the blisters formed were observed by the naked eye. The evaluation was conducted by evaluation criteria similar to the alkali resistance test.

4. Alkali-Resistant Adhesion

As one method of simulating corrosion due to the cathode in outdoor exposure and underhang exposure, a cathode was electrochemically created and the adhesion of the surface treatment film in a concentrated alkali environment was evaluated. Each test piece was scored at its coating layer over a length of 8 mm by a cutter down to the metal material. A constant current was applied to the scored part of the test piece in a 5 mass % NaCl aqueous solution under conditions of $1 \times 10^{-4}$ A and that state held for 72 hours. After that, the tape peeling method was used to measure the width of a coating blister from the scored part (largest value at one side). The evaluation was conducted based on the following evaluation criteria.

Evaluation Criteria—Cut Parts
VG: less than 1.0 mm
G: 1.0 mm to less than 2 mm
F: 2 mm to less than 3 mm
P: 3 mm or more 5. Storage Stability of Aqueous Surface Treatment Composition The aqueous surface treatment composition was stored in a 40° C. constant temperature apparatus for 3 months, then observed by the naked eye for the state of gelling or precipitation. The storage stability was evaluated based on the following criteria.

Evaluation Criteria
G: no change
F: more viscous or slight precipitates formed
P: gelling or precipitates formed Evaluation Results Table 4 shows the test results. From Table 4, Examples 1 to 32 of coated plated steel sheets having surface treatment layers formed using the aqueous surface treatment compositions of the present invention are found to exhibit excellent results in all aspects of performance of the primary working adhesion, secondary working adhesion, corrosion resistance in composite cycle test, outdoor exposure corrosion resistance, overhang corrosion resistance, acid resistance, alkali resistance, and alkali-resistant adhesion and exhibited performances the same as the chromate-based Comparative Examples 17, 22, and 27. On the other hand, Comparative Example 1 where the total amine value of the urethane resin (C) is over the prescribed range and Comparative Example 2 where the amount of cationic groups is over the prescribed range are found to be insufficient in overhang corrosion resistance and alkali-resistant adhesion.

Comparative Example 3 not containing an organic silicon compound (A) and Comparative Example 4 containing an organic silicon compound other than an aminosilane compound having primary amino groups are found to be remarkably inferior in working adhesion, overhang corrosion resistance, and alkali resistance.

Comparative Example 5 not containing a hexafluorometallic acid (B) and Comparative Examples 6 and 7 instead containing other acid ingredients are found to be insufficient in overhang corrosion resistance and alkali-resistant adhesion.

Comparative Example 8 not containing a urethane resin (C) is found to be insufficient in working adhesion, overhang corrosion resistance, and alkali-resistant adhesion.

Comparative Example 9 not containing a vanadium compound (D) is found to be insufficient in overhang corrosion resistance and alkali-resistant adhesion.

Comparative Example 10 having an amount of film of the surface treatment layer over the prescribed range is found to be insufficient in working adhesion, overhang corrosion resistance, and alkali-resistant adhesion.

Comparative Example 11 where the resin contained in the primer composition is a resin not having functional groups able to react with the primary amino groups of the organic silicon compound (A) and Comparative Example 12 not containing a rust-proofing pigment are found to be remarkably inferior in overhang corrosion resistance and alkali-resistant adhesion. Further, in Comparative Examples 13 to 16 based on the patent literature forming the prior art, at least one aspect of performance of the working adhesion, overhang corrosion resistance, and alkali-resistant adhesion is insufficient. The same was true for Comparative Examples 18 to 21 and Comparative Examples 23 to 26 applied to different plated steel sheets.

TABLE 1

| | | Content | | | | Ratio | | |
|---|---|---|---|---|---|---|---|---|
| | No. | Organic silicon compound (A) | Hexafluorometallic acid (B) | Urethane resin (C) | Vanadium compound (D) | $MF_6/NH_2$ | $(A+B)/(C)$ | (D)/total solids |
| Ex. | 1 | 3-aminopropyltrimethoxysilane | hexafluorozirconic acid | C1 | ammonium metavanadate | 0.3 | 3.0 | 1.0 |
| | 2 | 3-aminopropyltrimethoxysilane | hexafluorozirconic acid | C2 | ammonium metavanadate | 0.3 | 3.0 | 1.0 |
| | 3 | 3-aminopropyltrimethoxysilane | hexafluorozirconic acid | C3 | ammonium metavanadate | 0.3 | 3.0 | 1.0 |
| | 4 | 3-aminopropyltrimethoxysilane | hexafluorozirconic acid | C4 | ammonium metavanadate | 0.3 | 3.0 | 1.0 |
| | 5 | 3-aminopropyltrimethoxysilane | hexafluorozirconic acid | C5 | ammonium metavanadate | 0.3 | 3.0 | 1.0 |
| | 6 | 3-aminopropyltrimethoxysilane | hexafluorozirconic acid | C6 | ammonium metavanadate | 0.3 | 3.0 | 1.0 |
| | 7 | 3-aminopropyltrimethoxysilane | hexafluorozirconic acid | C7 | ammonium metavanadate | 0.3 | 3.0 | 1.0 |
| | 8 | 3-aminopropyltrimethoxysilane | hexafluorozirconic acid | C8 | ammonium metavanadate | 0.3 | 3.0 | 1.0 |
| | 9 | 3-aminopropyltrimethoxysilane | hexafluorozirconic acid | C9 | ammonium metavanadate | 0.3 | 3.0 | 1.0 |
| | 10 | 3-aminopropyltrimethoxysilane | hexafluorozirconic acid | C10 | ammonium metavanadate | 0.3 | 3.0 | 1.0 |
| | 11 | 3-aminopropyltrimethoxysilane | hexafluorozirconic acid | C11 | ammonium metavanadate | 0.3 | 3.0 | 1.0 |
| | 12 | 3-aminopropyltrimethoxysilane | hexafluorozirconic acid | C12 | ammonium metavanadate | 0.3 | 3.0 | 1.0 |
| | 13 | N-2-(aminoethyl)-3-aminopropyltriethoxysilane | hexafluorozirconic acid | C4 | ammonium metavanadate | 0.3 | 3.0 | 1.0 |
| | 14 | 3-aminopropyltrimethoxysilane | hexafluorotitanic acid | C4 | ammonium metavanadate | 0.3 | 3.0 | 1.0 |
| | 15 | 3-aminopropyltrimethoxysilane | hexafluorozirconic acid | C4 | ammonium metavanadate | 0.1 | 3.0 | 1.0 |
| | 16 | 3-aminopropyltrimethoxysilane | hexafluorozirconic acid | C4 | ammonium metavanadate | 0.2 | 3.0 | 1.0 |
| | 17 | 3-aminopropyltrimethoxysilane | hexafluorozirconic acid | C4 | ammonium metavanadate | 0.4 | 3.0 | 1.0 |
| | 18 | 3-aminopropyltrimethoxysilane | hexafluorozirconic acid | C4 | ammonium metavanadate | 0.5 | 3.0 | 1.0 |
| | 19 | 3-aminopropyltrimethoxysilane | hexafluorozirconic acid | C4 | ammonium metavanadate | 0.3 | 0.5 | 1.0 |
| | 20 | 3-aminopropyltrimethoxysilane | hexafluorozirconic acid | C4 | ammonium metavanadate | 0.3 | 1.0 | 1.0 |
| | 21 | 3-aminopropyltrimethoxysilane | hexafluorozirconic acid | C4 | ammonium metavanadate | 0.3 | 5.0 | 1.0 |
| | 22 | 3-aminopropyltrimethoxysilane | hexafluorozirconic acid | C4 | ammonium metavanadate | 0.3 | 7.0 | 1.0 |
| | 23 | 3-aminopropyltrimethoxysilane | hexafluorozirconic acid | C4 | ammonium metavanadate | 0.3 | 3.0 | 0.01 |
| | 24 | 3-aminopropyltrimethoxysilane | hexafluorozirconic acid | C4 | ammonium metavanadate | 0.3 | 3.0 | 0.1 |
| | 25 | 3-aminopropyltrimethoxysilane | hexafluorozirconic acid | C4 | ammonium metavanadate | 0.3 | 3.0 | 5.0 |
| | 26 | 3-aminopropyltrimethoxysilane | hexafluorozirconic acid | C4 | ammonium metavanadate | 0.3 | 3.0 | 10.0 |
| Comp. ex. | 27 | 3-aminopropyltrimethoxysilane | hexafluorozirconic acid | C14 | ammonium metavanadate | 0.3 | 3.0 | 1.0 |
| | 28 | 3-aminopropyltrimethoxysilane | hexafluorozirconic acid | C15 | ammonium metavanadate | 0.3 | 3.0 | 1.0 |
| | 29 | — | hexafluorozirconic acid | C4 | ammonium metavanadate | — | 3.0 | 1.0 |
| | 30 | γ-glycidoxypropyltrimethoxysilane | hexafluorozirconic acid | C4 | ammonium metavanadate | 0.3 | 3.0 | 1.0 |
| | 31 | 3-aminopropyltrimethoxysilane | — | C4 | ammonium metavanadate | — | 3.0 | 1.0 |
| | 32 | 3-aminopropyltrimethoxysilane | hydrofluoric acid | C4 | ammonium metavanadate | — | 3.0 | 1.0 |
| | 33 | 3-aminopropyltrimethoxysilane | phosphoric acid | C4 | ammonium metavanadate | — | 3.0 | 1.0 |
| | 34 | 3-aminopropyltrimethoxysilane | hexafluorozirconic acid | — | ammonium metavanadate | 0.3 | — | 1.0 |
| | 35 | 3-aminopropyltrimethoxysilane | hexafluorozirconic acid | C4 | — | 0.3 | 3.0 | — |

TABLE 2

| | | Polyol 1 | | Polyol 2 | | Isocyanate | | Introduced amine | | Cationic ingredient | |
|---|---|---|---|---|---|---|---|---|---|---|---|
| | | Content | Am't | Content | Am't | Content | Am't | Content | Am't | Content | Am't |
| Ex. | C1 | polyether A | 120 | — | 0 | 1,4-cyclohexane bismethylisocyanate | 100 | N-methyldiethanolamine | 10 | dimethyl sulfate | 3 |
| | C2 | polycarbonate A | 120 | — | 0 | 1,4-cyclohexane bismethylisocyanate | 100 | N-methyldiethanolamine | 10 | dimethyl sulfate | 3 |
| | C3 | polyether A | 120 | — | 0 | 1,4-cyclohexane bismethylisocyanate | 100 | N-methyldiethanolamine | 10 | dimethyl sulfate | 3 |
| | C4 | polyether A | 84 | polycarbonate A | 36 | 1,4-cyclohexane bismethylisocyanate | 100 | N-methyldiethanolamine | 10 | dimethyl sulfate | 3 |
| | C5 | polyether B | 84 | polycarbonate A | 36 | 1,4-cyclohexane bismethylisocyanate | 100 | N-methyldiethanolamine | 10 | dimethyl sulfate | 3 |
| | C6 | polyether A | 84 | polycarbonate B | 36 | 1,4-cyclohexane bismethylisocyanate | 100 | N-methyldiethanolamine | 10 | dimethyl sulfate | 3 |
| | C7 | polyether A | 84 | polycarbonate A | 36 | hexamethylene diisocyanate | 100 | N-methyldiethanolamine | 10 | dimethyl sulfate | 3 |
| | C8 | polyether A | 84 | polycarbonate A | 36 | 1,4-cyclohexane bismethylisocyanate | 100 | N-methyldiethanolamine | 10 | acetic acid | 1.5 |
| | C9 | polyether A | 36 | polycarbonate A | 84 | 1,4-cyclohexane bismethylisocyanate | 100 | N-methyldiethanolamine | 10 | dimethyl sulfate | 3 |

TABLE 2-continued

|  |  | Polyol 1 |  | Polyol 2 |  | Isocyanate |  | Introduced amine |  | Cationic ingredient |  |
|---|---|---|---|---|---|---|---|---|---|---|---|
|  |  | Content | Am't | Content | Am't | Content | Am't | Content | Am't | Content | Am't |
|  | C10 | polyether A | 84 | polycarbonate A | 36 | 1,4-cyclohexane bismethylisocyanate | 100 | N-methyldiethanolamine | 5 | dimethyl sulfate | 3 |
|  | C11 | polyether A | 84 | polycarbonate A | 36 | 1,4-cyclohexane bismethylisocyanate | 100 | N-methyldiethanolamine | 10 | dimethyl sulfate | 4.4 |
|  | C12 | polyether A | 84 | polycarbonate A | 36 | 1,4-cyclohexane bismethylisocyanate | 100 | N-methyldiethanolamine | 30 | dimethyl sulfate | 1 |
| Comp. ex. | C13 | polyether A | 84 | polycarbonate A | 36 | 1,4-cyclohexane bismethylisocyanate | 100 | N-methyldiethanolamine | 1 | dimethyl sulfate | 3 |
|  | C14 | polyether A | 84 | polycarbonate A | 36 | 1,4-cyclohexane bismethylisocyanate | 100 | N-methyldiethanolamine | 50 | dimethyl sulfate | 3 |
|  | C15 | polyether A | 84 | polycarbonate A | 36 | 1,4-cyclohexane bismethylisocyanate | 100 | N-methyldiethanolamine | 10 | dimethyl sulfate | 6 |
|  | C16 | polyether A | 84 | polycarbonate A | 36 | 1,4-cyclohexane bismethylisocyanate | 100 | N-methyldiethanolamine | 10 | dimethyl sulfate | 0.5 |

TABLE 3

|  | Cationic groups (mol/kg) | Total amine value (mgKOH/g) | Aqueous dispersion ability |
|---|---|---|---|
| C1 | 0.10 | 5 | G |
| C2 | 0.10 | 5 | G |
| C3 | 0.10 | 5 | G |
| C4 | 0.10 | 5 | G |
| C5 | 0.10 | 5 | G |
| C6 | 0.10 | 5 | G |
| C7 | 0.10 | 5 | G |
| C8 | 0.11 | 5 | G |
| C9 | 0.10 | 5 | G |
| C10 | 0.11 | 1 | G |
| C11 | 0.15 | 5 | G |
| C12 | 0.03 | 10 | G |
| C13 | 0.11 | 0.5 | P |
| C14 | 0.09 | 15 | G |
| C15 | 0.21 | 5 | G |
| C16 | 0.02 | 5 | P |

TABLE 4

| Level no. | Material | Surface treatment composition | Am't of coating (g/m²) | Primer composition | Thickness (μm) | Top coat | Thickness (μm) | Working adhesion Primary | Working adhesion Secondary | Composite cycle Cut | Composite cycle End face | Outdoor exposure Cut | Outdoor exposure End face | Underhang exposure Cut | Underhang exposure End face | Chemical resistance Alkali | Chemical resistance Acid | Alkali-resistant adhesion | Storage stability |
|---|---|---|---|---|---|---|---|---|---|---|---|---|---|---|---|---|---|---|---|
| Ex. 1 | G1 | No. 1 | 0.05 | P1 | 5 | T1 | 15 | VG | G | VG | VG | VG | VG | VG | VG | VG | VG | VG | G |
| Ex. 2 | G1 | No. 2 | 0.05 | P1 | 5 | T1 | 15 | VG | VG | VG | VG | VG | VG | VG | VG | VG | VG | VG | G |
| Ex. 3 | G1 | No. 3 | 0.05 | P1 | 5 | T1 | 15 | VG | VG | VG | VG | VG | VG | G | G | G | VG | G | G |
| Ex. 4 | G1 | No. 4 | 0.05 | P1 | 5 | T1 | 15 | VG | VG | VG | VG | VG | VG | VG | VG | VG | VG | VG | G |
| Ex. 5 | G1 | No. 5 | 0.05 | P1 | 5 | T1 | 15 | VG | VG | VG | VG | VG | VG | VG | VG | VG | VG | VG | G |
| Ex. 6 | G1 | No. 6 | 0.05 | P1 | 5 | T1 | 15 | VG | VG | VG | VG | VG | VG | VG | VG | VG | VG | VG | G |
| Ex. 7 | G1 | No. 7 | 0.05 | P1 | 5 | T1 | 15 | VG | VG | VG | VG | VG | VG | VG | VG | VG | VG | VG | G |
| Ex. 8 | G1 | No. 8 | 0.05 | P1 | 5 | T1 | 15 | VG | VG | VG | VG | VG | VG | VG | VG | VG | VG | VG | G |
| Ex. 9 | G1 | No. 9 | 0.05 | P1 | 5 | T1 | 15 | VG | VG | VG | VG | VG | VG | VG | VG | VG | VG | VG | G |
| Ex. 10 | G1 | No. 10 | 0.05 | P1 | 5 | T1 | 15 | VG | VG | VG | VG | VG | G | VG | G | G | VG | G | G |
| Ex. 11 | G1 | No. 11 | 0.05 | P1 | 5 | T1 | 15 | VG | VG | VG | VG | VG | VG | VG | VG | VG | VG | VG | G |
| Ex. 12 | G1 | No. 12 | 0.05 | P1 | 5 | T1 | 15 | VG | VG | VG | VG | VG | VG | VG | VG | G | VG | VG | G |
| Ex. 13 | G1 | No. 13 | 0.05 | P1 | 5 | T1 | 15 | VG | VG | VG | VG | VG | VG | VG | VG | G | VG | VG | G |
| Ex. 14 | G1 | No. 14 | 0.05 | P1 | 5 | T1 | 15 | VG | VG | VG | VG | VG | VG | VG | VG | VG | VG | VG | G |
| Ex. 15 | G1 | No. 15 | 0.05 | P1 | 5 | T1 | 15 | VG | VG | VG | VG | VG | VG | VG | VG | G | VG | VG | G |
| Ex. 16 | G1 | No. 16 | 0.05 | P1 | 5 | T1 | 15 | VG | G | VG | VG | VG | VG | VG | VG | VG | VG | VG | G |
| Ex. 17 | G1 | No. 17 | 0.05 | P1 | 5 | T1 | 15 | VG | VG | VG | VG | VG | VG | VG | VG | VG | VG | VG | G |
| Ex. 18 | G1 | No. 18 | 0.05 | P1 | 5 | T1 | 15 | VG | VG | VG | VG | VG | VG | VG | VG | G | VG | VG | G |
| Ex. 19 | G1 | No. 19 | 0.05 | P1 | 5 | T1 | 15 | G | G | VG | VG | VG | VG | VG | G | G | VG | G | G |
| Ex. 20 | G1 | No. 20 | 0.05 | P2 | 5 | T1 | 15 | VG | VG | VG | VG | VG | VG | VG | VG | VG | VG | VG | G |
| Ex. 21 | G1 | No. 21 | 0.05 | P1 | 5 | T1 | 15 | G | G | VG | VG | VG | VG | VG | VG | VG | VG | VG | G |
| Ex. 22 | G1 | No. 22 | 0.05 | P1 | 5 | T1 | 15 | VG | VG | VG | VG | VG | VG | VG | VG | VG | VG | VG | G |
| Ex. 23 | G1 | No. 23 | 0.05 | P1 | 5 | T1 | 15 | VG | VG | VG | VG | VG | VG | VG | VG | VG | VG | VG | G |
| Ex. 24 | G1 | No. 24 | 0.05 | P1 | 5 | T1 | 15 | G | G | VG | VG | VG | VG | VG | VG | G | VG | G | G |
| Ex. 25 | G1 | No. 25 | 0.05 | P1 | 5 | T1 | 15 | VG | VG | VG | VG | VG | VG | VG | VG | VG | VG | VG | G |
| Ex. 26 | G1 | No. 26 | 0.05 | P1 | 5 | T1 | 15 | VG | VG | VG | VG | VG | VG | VG | VG | VG | VG | VG | G |
| Ex. 27 | G1 | No. 4 | 0.01 | P1 | 5 | T1 | 15 | VG | VG | VG | VG | VG | VG | VG | VG | VG | VG | VG | G |
| Ex. 28 | G1 | No. 4 | 0.5 | P1 | 5 | T1 | 15 | VG | VG | VG | VG | VG | VG | VG | VG | VG | VG | VG | G |
| Ex. 29 | G2 | No. 4 | 0.05 | P1 | 5 | T1 | 15 | VG | VG | VG | VG | VG | VG | VG | VG | VG | VG | VG | G |
| Ex. 30 | G3 | No. 4 | 0.05 | P1 | 5 | T1 | 15 | VG | VG | VG | VG | VG | VG | VG | VG | VG | VG | VG | G |
| Ex. 31 | G4 | No. 4 | 0.05 | P1 | 5 | T1 | 15 | VG | VG | VG | VG | VG | VG | VG | VG | VG | VG | VG | G |
| Ex. 32 | G1 | No. 27 | 0.05 | P1 | 5 | T1 | 15 | VG | VG | G | G | F | F | F | F | VG | VG | G | G |
| Comp. Ex. 1 | G1 | No. 28 | 0.05 | P1 | 5 | T1 | 15 | G | G | G | G | G | F | G | F | F | G | F | G |
| Comp. Ex. 2 | G1 | No. 29 | 0.05 | P1 | 5 | T1 | 15 | P | P | F | P | F | P | F | P | F | F | F | P |
| Comp. Ex. 3 | G1 | No. 30 | 0.05 | P1 | 5 | T1 | 15 | P | P | F | F | F | F | F | F | P | F | P | P |
| Comp. Ex. 4 | G1 | No. 31 | 0.05 | P1 | 5 | T1 | 15 | VG | VG | G | G | G | F | F | F | F | F | F | F |
| Comp. Ex. 5 | G1 | No. 31 | 0.05 | P1 | 5 | T1 | 15 | VG | VG | G | G | G | F | F | F | F | F | F | F |

TABLE 4-continued

| Level no. | Material | Surface treatment film layer Surface treatment composition | Surface treatment film layer Am't of coating (g/m²) | Primer coating layer Primer composition | Primer coating layer Thickness (µm) | Top coating layer Top coat | Top coating layer Thickness (µm) | Working adhesion Primary | Working adhesion Secondary | Corrosion resistance Composite cycle Cut | Corrosion resistance Composite cycle End face | Corrosion resistance Outdoor exposure Cut | Corrosion resistance Outdoor exposure End face | Corrosion resistance Underhang exposure Cut | Corrosion resistance Underhang exposure End face | Chemical resistance Alkali | Chemical resistance Acid | Alkali-resistant adhesion | Storage stability |
|---|---|---|---|---|---|---|---|---|---|---|---|---|---|---|---|---|---|---|---|
| Comp. Ex. 6 | G1 | No. 32 | 0.05 | P1 | 5 | T1 | 15 | VG | VG | G | G | G | F | F | F | F | F | F | G |
| Comp. Ex. 7 | G1 | No. 33 | 0.05 | P1 | 5 | T1 | 15 | VG | VG | G | G | G | F | F | F | P | F | P | G |
| Comp. Ex. 8 | G1 | No. 34 | 0.05 | P1 | 5 | T1 | 15 | P | P | F | F | F | F | F | P | P | F | P | G |
| Comp. Ex. 9 | G1 | No. 35 | 0.05 | P1 | 5 | T1 | 15 | VG | VG | VG | VG | G | G | F | F | VG | VG | VG | G |
| Comp. Ex. 10 | G1 | No. 4 | 1.0 | P1 | 5 | T1 | 15 | P | P | G | G | F | F | F | P | F | G | F | G |
| Comp. Ex. 11 | G1 | No. 4 | 0.05 | P3 | 5 | T1 | 15 | F | F | G | G | G | F | G | F | G | G | G | G |
| Comp. Ex. 12 | G1 | No. 4 | 0.05 | P4 | 5 | T1 | 15 | VG | VG | P | P | P | P | P | P | P | F | P | F |
| Comp. Ex. 13 | G1 | No. 36 | 0.05 | P1 | 5 | T1 | 15 | VG | VG | G | G | G | F | F | F | F | F | F | F |
| Comp. Ex. 14 | G1 | No. 37 | 0.05 | P1 | 5 | T1 | 15 | VG | VG | G | G | F | F | F | F | G | F | F | F |
| Comp. Ex. 15 | G1 | No. 38 | 0.05 | P1 | 5 | T1 | 15 | P | P | F | F | F | F | F | F | F | F | F | F |
| Comp. Ex. 16 | G1 | No. 39 | 0.05 | P5 | 5 | T1 | 15 | F | F | VG | VG | G | G | G | G | G | G | G | G |
| Comp. Ex. 17 | G1 | chromate | Cr: 0.03 | Cr | 5 | T1 | 15 | VG | VG | VG | VG | VG | VG | VG | VG | VG | VG | VG | G |
| Comp. Ex. 18 | G2 | No. 36 | 0.05 | P1 | 5 | T1 | 15 | VG | VG | G | G | G | F | F | F | F | F | F | F |
| Comp. Ex. 19 | G2 | No. 37 | 0.05 | P1 | 5 | T1 | 15 | VG | VG | G | G | G | F | F | F | G | F | F | F |
| Comp. Ex. 20 | G2 | No. 38 | 0.05 | P1 | 5 | T1 | 15 | P | P | F | F | F | F | F | F | F | F | F | F |
| Comp. Ex. 21 | G2 | No. 39 | 0.05 | P5 | 5 | T1 | 15 | VG | VG | VG | VG | G | G | G | G | G | G | G | G |
| Comp. Ex. 22 | G2 | chromate | Cr: 0.03 | Cr | 5 | T1 | 15 | VG | VG | VG | VG | VG | VG | VG | VG | VG | VG | VG | G |

TABLE 4-continued

| Level no. | Material | Surface treatment film layer | | Primer coating layer | | Top coating layer | | Working adhesion | | Corrosion resistance | | | | | | Chemical resistance | | Alkali-resistant adhesion | Storage stability |
|---|---|---|---|---|---|---|---|---|---|---|---|---|---|---|---|---|---|---|---|
| | | | | | | | | | | Composite cycle | | Outdoor exposure | | Underhang exposure | | | | | |
| | | Surface treatment composition | Am't of coating (g/m²) | Primer composition | Thickness (µm) | Top coat | Thickness (µm) | Primary | Secondary | Cut | End face | Cut | End face | Cut | End face | Alkali | Acid | | |
| Comp. Ex. 23 | G3 | No. 36 | 0.05 | P1 | 5 | T1 | 15 | VG | VG | G | G | G | G | F | F | F | F | F | F |
| Comp. Ex. 24 | G3 | No. 37 | 0.05 | P1 | 5 | T1 | 15 | VG | VG | G | G | G | F | F | F | G | F | F | F |
| Comp. Ex. 25 | G3 | No. 38 | 0.05 | P1 | 5 | T1 | 15 | P | P | F | F | F | F | F | F | F | F | F | F |
| Comp. Ex. 26 | G3 | No. 39 | 0.05 | P5 | 5 | T1 | 15 | F | F | VG | VG | G | G | G | G | G | G | G | G |
| Comp. Ex. 27 | G3 | chromate | Cr: 0.03 | Cr | 5 | T1 | 15 | VG | VG | VG | VG | VG | VG | VG | VG | VG | VG | VG | G |

The invention claimed is:

1. A surface treatment composition for coated steel sheet comprising:
    an organic silicon compound (A),
    a hexafluorometallic acid (B),
    a urethane resin having one or more cationic groups (C),
    a vanadium compound (D), and
    an aqueous medium (E), wherein
    the organic silicon compound (A) is selected from a hydrolyzed product and a hydrolyzed condensate of an aminosilane compound having one or more primary amino groups, as well as mixtures thereof,
    the cationic groups of the urethane resin (C) are cationic groups represented by the following general formula [I]:

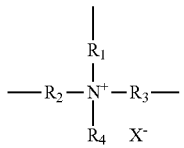

Wherein each of $R_1$, $R_2$ and $R_3$ represents, mutually independently, $C_1$ to $C_6$ alkyl group or $C_2$ to $C_{10}$ alkylene group, $R_4$ represents a hydrogen atom or $C_1$ to $C_6$ alkyl group, and $X^-$ represents an anionic counter ion,
    the cationic groups are included in the urethane resin (C) within the range of 0.03 to 0.15 mol/kg, and a total amine value of said urethane resin (C) is 1 to 10 mgKOH/g.

2. The surface treatment composition for coated steel sheet according to claim 1, wherein
    a ratio [$MF_6/NH_2$] of number of moles of the hexafluorometallic acid ($MF_6$) (B) to a number of moles of the primary amino groups ($NH_2$) of the organic silicon compound (A) is 0.2 to 0.4, and
    a solid content mass ratio [(A+B)/C] of the total of the organic silicon compound (A) and the hexafluorometallic acid (B) to the urethane resin (C) is 1.0 to 5.0.

3. The surface treatment composition for coated steel sheet according to claim 1 or 2, wherein the urethane resin (C) has polycarbonate structural units and polyether structural units.

4. The surface treatment composition for coated steel sheet according to claim 1 or 2, wherein said hexafluorometallic acid (B) is selected from hexafluorozirconic acid, hexafluorotitanic acid, and mixtures thereof.

5. A surface-treated plated steel sheet comprising plated steel sheet on at least one surface of which is provided a surface treatment layer having film mass of 0.01 to 0.5 g/m² formed by coating the plated steel sheet with the surface treatment composition for coated steel sheet according to claim 1 or 2, then drying the surface treatment composition.

6. The surface-treated steel sheet according to claim 5, wherein the plated steel sheet is selected from hot dip zinc alloy-plated steel sheet containing, by mass % 55% of Al and 1.6% of Si; Zn—Al—Mg—Si—Cr—Ca(Sr) alloy plated steel sheet with a plating layer comprised of, by mass %, Al: 25 to 75%, Mg: 0.1 to 10%, Si: 1 to 7.5%, Cr: 0.05 to 5.0%, and at least one of Ca and Sr: 0.001 to 0.5%, and having a balance of Zn and unavoidable impurities; and Zn—Al—Mg—Si alloy plated steel sheet with a plating layer comprised of, by mass %, Al: 2 to 19%, Mg: 1 to 10%, and Si: 0.01 to 2%, and having a balance of Zn and unavoidable impurities.

7. A coated plated steel sheet comprising plated steel sheet on at least one surface of which are provided, in order,
    a surface treatment layer which includes the surface treatment composition for coated steel sheet according to claim 1 or 2,
    a primer layer, and
    a top layer which contains a colored pigment,
    wherein
    the primer layer contains a resin having one or more functional groups which can react with the primary amino groups of the organic silicon compound (A) and has a rust-proofing pigment.

8. The coated plated steel sheet according to claim 7, wherein the plated steel sheet is selected from hot dip zinc alloy-plated steel sheet containing, by mass %, 55% of Al and 1.6% of Si; Zn—Al—Mg—Si—Cr—Ca(Sr) alloy plated steel sheet with a plating layer comprised of, by mass %, Al: 25 to 75%, Mg: 0.1 to 10%, Si: 1 to 7.5%, Cr: 0.05 to 5.0%, and at least one of Ca and Sr: 0.001 to 0.5%, and having a balance of Zn and unavoidable impurities; and Zn—Al—Mg—Si alloy-plated steel sheet with a plating layer comprised of, by mass %, Al: 2 to 19%, Mg: 1 to 10%, and Si: 0.01 to 2%, and having a balance of Zn and unavoidable impurities.

9. A method for producing a surface-treated plated steel sheet, the method comprising a surface treatment step that comprises
    coating the surface treatment composition for coated steel sheet according to claim 1 or 2 on at least one surface of the plated steel sheet, and
    heating and drying the surface treatment composition to form a surface treatment layer on the surface of the plated steel sheet, without rinsing.

10. The method according to claim 9, wherein the method further comprises, after the surface treatment step,
    a step of coating a primer composition on the surface-treated plated steel sheet and heating and drying the primer composition to form a primer layer, and
    a step of applying a top coating composition on the primer layer, then heating and drying the top coating composition to form a top layer.

* * * * *